UNITED STATES PATENT OFFICE.

RUDOLF HEINZ, OF HANOVER, GERMANY, ASSIGNOR TO GEBRÜDER FLICK, OF OPLADEN, GERMANY.

PROCESS OF MAKING NITRITES.

SPECIFICATION forming part of Letters Patent No. 670,021, dated March 19, 1901.

Application filed September 10, 1900. Serial No. 29,594. (No specimens.)

*To all whom it may concern:*

Be it known that I, RUDOLF HEINZ, a subject of the King of Saxony, residing at Hanover, Province of Hanover, Empire of Germany, have invented new and useful Improvements in Processes for the Manufacture of Nitrites, of which the following is a full specification.

There have been suggested a great many methods for the manufacture of nitrites from nitrates which on carrying out in practice have not proved a success from a commercial point of view. Practically all these methods were based on the reduction of nitrates, or rather of the acid radical of nitrates, by means of the usual reducing agents.

The object of the present invention is also the reduction of the acid radical of nitrates; but it is proposed to employ for that purpose sulfur dioxid in a gaseous state. It was ascertained by repeated experiments that if gaseous sulfur dioxid be passed over a mixture of a nitrate and an oxid, principally an oxid of an alkali or an alkaline earth heated up to a point where the fluxed mass becomes sintered, the nitrate is completely reduced to a nitrite, whereas the sulfur dioxid is oxidized to sulfuric acid, which, *in statu nascendi*, combines with the free base present. The base may also be present as a carbonate, although the free oxid or its hydrate will prove more efficient. The reaction taking place may be represented by the following equations, where sodium nitrate and caustic lime may be supposed to be employed in the process:

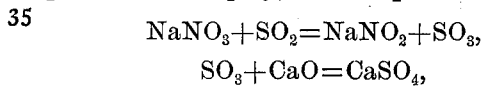

or, expressed in one single equation,

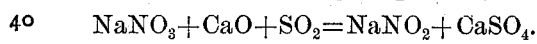

From the product of reaction obtained, which represents a mixture of sodium nitrite and calcium sulfate, the nitrite is lixiviated with water and the solution worked up for pure nitrite in the usual manner, whereas calcium sulfate is left as an insoluble residue.

If bases be employed the sulfates of which are soluble in water—for instance, alkali hydrates or carbonates—there results an alkaline sulfate, which makes the separation of the nitrite and its preparation in a pure state a somewhat difficult task. For this reason it is preferable to employ the oxids of alkaline earths in the process. Anyhow, if properly carried out, the decomposition and reduction of the nitrate is complete. The yield is nearly a theoretical one, and the separation from the insoluble sulfate is a simple operation, so that the preparation of a pure nitrite offers no difficulties. It is also of the greatest importance that the sulfur dioxid is as nearly free from air (oxygen) as possible, so that no secondary oxidation of the sulfur dioxid may take place, because the sulfuric acid thus formed would act injuriously on the nitrate or even the nitrite freshly formed, whereby the yield would considerably decrease.

The quantity of the base to be added is not confined to molecular proportions. An excess of the base is even profitable.

A mode of manufacturing nitrites by fusing a mixture of equal molecules of anhydrous potassium sulfite and potassium nitrate has been suggested by Etard (*Jahresber. d. Chemie*, 1877, page 239) where nitrite and an alkaline sulfate is formed according to the following equation:

This mode of preparation is, however, not based on the same principle as the present process, as it must be supposed that by using sulfur dioxid a direct reduction of the acid radical of the nitrate is effected. In order to prove that supposition, I may mention that if an intimate mixture of sodium nitrate and calcium sulfite be heated up to the fusing-point numerous sparks issue from the mass, showing that a loss of oxygen has taken place, whereas on passing sulfur dioxid over a heated mixture of a nitrate and calcium hydrate no such loss occurs. As a consequence the yield of nitrite is much greater in the second case than when using a sulfite in place of sulfur dioxid.

The present process is carried out on a large scale thus: Caustic lime is very intimately mixed with a nitrate. This is effected by slaking caustic lime with a concentrated solution of potassium nitrate—*i. e.*, one hundred and sixty kilos caustic lime are slaked with a very concentrated solution of two hundred kilos sodium nitrate. This mixture is heated in suitable retorts until the mass is sintered, sulfur dioxid free from air being passed over the mixture all the while. The process is finished when all the nitrate has been reduced to nitrite. The product of reaction is taken up with hot water and the solution of the nitrite filtered from the insoluble residue consisting of calcium sulfate. The filtrate is worked up for pure nitrite by boiling down and crystallization.

What I claim is—

1. A process for the manufacture of nitrites consisting in passing sulfur dioxid as free from air as possible over a highly-heated mixture of a nitrite and an alkali essentially as described.

2. A process for the manufacture of nitrites consisting in passing sulfur dioxid as free from air as possible over a highly-heated mixture of sodium nitrite and calcium oxid essentially as described.

In witness whereof I have hereunto set my hand in presence of two witnesses.

RUD. HEINZ.

Witnesses:
ALFRED ANDRAE,
LEONORE RASCH.